United States Patent [19]

James et al.

[11] Patent Number: 6,006,289

[45] Date of Patent: Dec. 21, 1999

[54] SYSTEM FOR TRANSFERRING DATA SPECIFIED IN A TRANSACTION REQUEST AS A PLURALITY OF MOVE TRANSACTIONS RESPONSIVE TO RECEIPT OF A TARGET AVAILABILITY SIGNAL

[75] Inventors: David V. James, Palo Alto; Glen D. Stone, San Jose, both of Calif.

[73] Assignee: Apple Computer, Inc., Cupertino, Calif.

[21] Appl. No.: 08/748,147

[22] Filed: Nov. 12, 1996

[51] Int. Cl.$^6$ .................................................. G06F 13/14
[52] U.S. Cl. ...................... 710/35; 709/234; 340/825.44; 370/431
[58] Field of Search ..................... 370/61, 431; 709/234; 710/113, 35; 340/825.44

[56] References Cited

U.S. PATENT DOCUMENTS

| | | | |
|---|---|---|---|
| 4,829,421 | 5/1989 | Ritchie | 395/200.64 |
| 5,280,470 | 1/1994 | Buhrke | 370/13 |
| 5,444,438 | 8/1995 | Goldberg | 340/825.44 |
| 5,555,395 | 9/1996 | Parks | 711/145 |
| 5,559,797 | 9/1996 | Murase | 370/61 |
| 5,699,361 | 12/1997 | Ding et al. | 370/431 |
| 5,787,264 | 7/1998 | Christiansen et al. | 710/113 |

*Primary Examiner*—Thomas C. Lee
*Assistant Examiner*—Abdelmoniem Elamin
*Attorney, Agent, or Firm*—Fenwick & West LLP

[57] ABSTRACT

A system and method for coordinating the transmission and receipt of large data blocks as a series of smaller burst transfers through an intermediate interconnect coupling a pair of devices. A device receiving a transaction request ("initiator") specifies the data block size of the requested transaction to the other device ("target"). The target response will indicate that it is committed to the transaction, that it does not support requested transactions of the specified data block size, or that it currently lacks the buffer capacity to commit to the requested transaction. In the first instance, the initiator and target exchange the data block through the interconnect as a series of burst transfers until all data has been transferred, at which time the initiator (for read transactions) or the target (for write transactions) forwards the transferred data as a data block of the specified size. When the response indicates the target supports only smaller data block sizes, the initiator may adjust the specified data block size accordingly and proceed with the transaction once the target is committed. When the target response indicates insufficient buffers are currently available to accommodate data of a supported block size, the transaction may proceed as a series of independent burst transfers until all data is transferred or buffers sufficient for the specified block size become available.

28 Claims, 10 Drawing Sheets

SYSTEM FOR TRANSFERRING DATA SPECIFIED IN A TRANSACTION REQUEST AS A PLURALITY OF MOVE TRANSACTIONS RESPONSIVE TO RECEIPT OF A TARGET AVAILABILITY SIGNAL

BACKGROUND OF THE INVENTION

1. Technical Field

This invention relates to the area of digital data communications and in particular, to the communication of digital data through high speed interconnects between devices characterized by data block sizes larger than the burst transfer size supported by the interconnect.

2. Background Art

High performance buses and bus-like interconnects ("interconnects") are characterized by relatively small block transfer sizes and correspondingly short arbitration latencies. For example, the Scalable Coherent Interconnect (SCI, IEEE Std 1596-1992) provides bus-like read and write transactions of sixty four (64) bytes each, as does Serial Express, a proposed higher-performance, longer-distance extension of the Serial Bus (IEEE Std. 1394-1995). Both interconnects are designed to support high-speed data transfers between high speed devices such as video cameras/monitors, PCI-card chassis, high performance I/O devices, and Serial Bus bridges.

The relatively small burst transfer size supported by SCI and Serial Express can create a bottleneck when data packets are being transported between devices that support larger sized data blocks, i.e. much larger than 64 bytes. A general rule of thumb for efficient data transfer across a bus is that the time necessary for arbitration and header transmission should allow on the order of 75% of the time to be available for transferring data. Thus, buses with longer arbitration latencies (such as Serial Bus) typically support large data block transfers. If a data block is simply fragmented into multiple 64-byte data packets for transmission through an intermediate Serial Express interconnect, subsequent transmission of each fragmented data packet on the remote Serial Bus would be inefficient. In effect, each data burst would be subject to the longer arbitration latency of the remote Serial Bus, making transfer of the data on the remote Serial Bus very slow.

The mismatch in block sizes and the resulting bottleneck may be substantial as, for example, where a pair of Serial Buses are coupled by a Serial Express interconnect through a pair of Serial Express-Serial Bus bridges. In this case, a 4k byte burst transfer originating on one Serial Bus is fragmented at the first bridge into sixty four 64-byte burst transfers for transmission through the interconnect. If treated independently, each of the sixty four 64-byte burst transfers will be subject to the Serial Bus arbitration latency at the second bridge.

Another problem presented by the mismatch in burst transfer sizes occurs where a bus master on a PCI bus writes data to a memory on a host bus through a Serial Express interconnect. Given the relatively high latency for host bus memory accesses, the Serial Express-to-PCI bridge requires a large posted write buffer for efficient data transfer. Simply fragmenting a large, contiguous block of posted writes into 64-byte burst transfers for concurrent transmission across the interconnect will not work correctly. Posted-writes must be delivered in the order received, but high performance interconnects like Serial Express (and SCI) can re-order the 64-byte blocks during transmission.

Mismatches in data block sizes can also create inefficiencies where devices other than buses are coupled through high speed interconnects. For example, large data blocks may be written from a hard disc to memory through a high speed interconnect. Address translation for such writes will be more efficient if memory processes the data as a block rather than as multiple fragments.

In each case described, the transmission inefficiencies arise because there is no effective block transfer protocol to recognize the integrity of the original data block and reconstruct the data block following transmission through the interconnect. PCI bus protocols include hint bits, which may be used to indicate when additional read or write transactions should be expected. However, the hint bits do not specify the amount of additional data. Nor do the hint bits or any other elements of the PCI bus protocol provide means for committing resources to the transaction or reassembling fragmented data blocks following transmission. Likewise, the inclusion of future-use hints in transactions are of marginal utility because the interconnect may reorder the original transaction, which includes the future use hint, with respect to the following transactions to which the hint applies.

There is thus a need for a system and method for maintaining the integrity of large data blocks when they are fragmented for transfer through a high speed interconnect, supporting burst transfer sizes that are smaller than the data block.

SUMMARY OF THE INVENTION

The present invention is a system and method for efficiently transporting blocks of data through a high speed, bus-like interconnect, where the burst transfer size supported by the interconnect is smaller than the size of the data blocks to be transported. The invention provides a transmission protocol that allows initiator and target bridges, through which requesting and responding nodes, respectively, are coupled to the interconnect, to coordinate the transmission and receipt of large data blocks as a series of smaller burst transfers. In particular, the protocol defines signals that are exchanged between the initiator bridge ("initiator") and the target bridge ("target"). The exchanged signals (1) indicate the data block size to the target, (2) indicate to the initiator the available buffer capacity at the target, (3) transmit the data block to the committed target buffers through the interconnect as a series of burst transfers, and (4) determine when the transfer has been completed.

In accordance with the present invention, on receipt of a read request, an initiator allocates a buffer for storing requested data, generates a modified read request ("readPlus") specifying the size of the data block requested and the location of the allocated buffer, launches the readPlus to the target through the high speed interconnect, and waits for a response from the target. If the target supports data blocks that are smaller than the size specified by the initiator, it indicates the supported data block size to the initiator, which adjusts the specified block size accordingly and launches a new readPlus. A target having sufficient capacity to accommodate the specified size, indicates to the initiator that the transaction can proceed, retrieves the requested data block, and transmits the retrieved data block to the initiator as a series of burst transfers. When all burst transfers have been transmitted, the initiator forwards the data as a block to the requesting node.

On receipt of a write request, an initiator specifies the size of the data block to be written in a modified write request ("writePlus"), and launches the writePlus request to the target. A target having sufficient capacity to accommodate the specified data block size, responds with the locations of buffers allocated to receive the data block. A target supporting data blocks smaller than the specified size, indicates the supported size to the initiator, which adjusts its writePlus accordingly and resends it. When the target response indicates it has committed the requested buffer space to the transaction, the initiator transfers the data to the specified target buffers in a series of burst transfers. When all burst transfers have been transmitted, the target forwards the data as a block to the specified node and sends an acknowledgment burst to the initiator.

In order to track progress of the burst transfers, the target and initiator each includes a completion counter, which is adjusted as each burst transfer through the interconnect is completed. For robust data transfers on less dependable interconnects, the initiator and target include buffer status bits for tracking the components of the data block that have been received. For each data block transmitted, the bridge that receives the burst transfers, i.e. the initiator for reads and the target for writes, transmits a write indicating that all burst transfers have been received. If the write indicating receipt of all burst transfers is not received within an expected time-out period, the device transmitting the burst transfers, i.e. the target for reads and the initiator for writes, uses a read transaction to determine which burst transfers have been done. This allows incompleted transactions to be completed through additional transfers, without duplicating transfers of data already received.

The present invention is described with reference to high speed interconnects that support 64-byte burst transfers and buses that support up to 4k byte data blocks. These burst and block sizes are used merely to illustrate the invention, which may be usefully implemented in any system where large data blocks must be divided for transfer through an interconnect.

DETAILED DESCRIPTION OF THE INVENTION

Figure 1A:
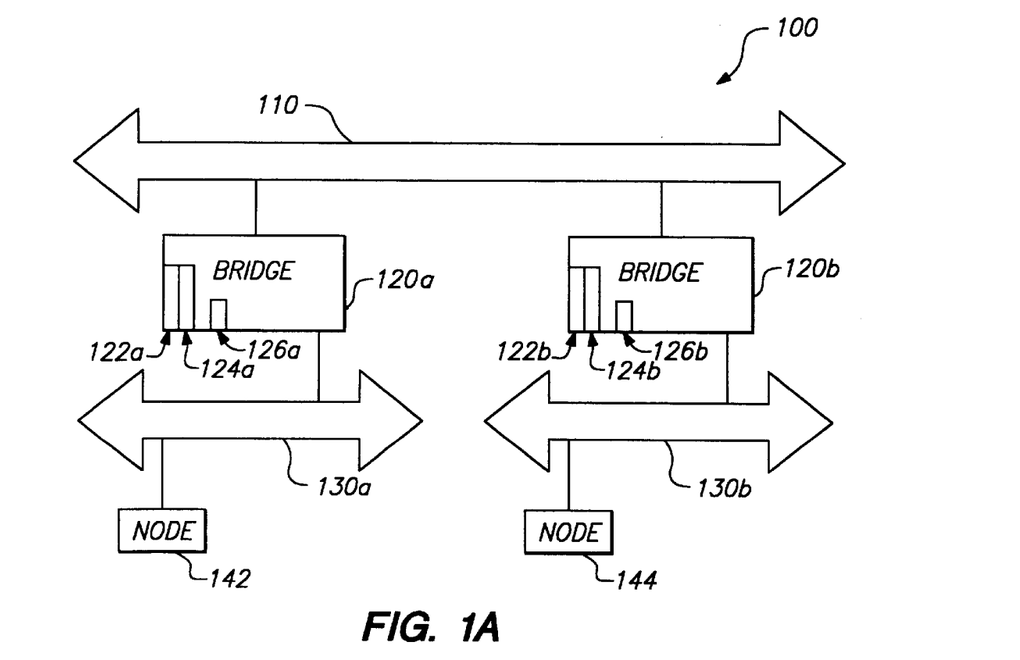
FIGS. 1A and 1B are block diagrams of systems on which the method of the present invention may be implemented.
Figure 1B:
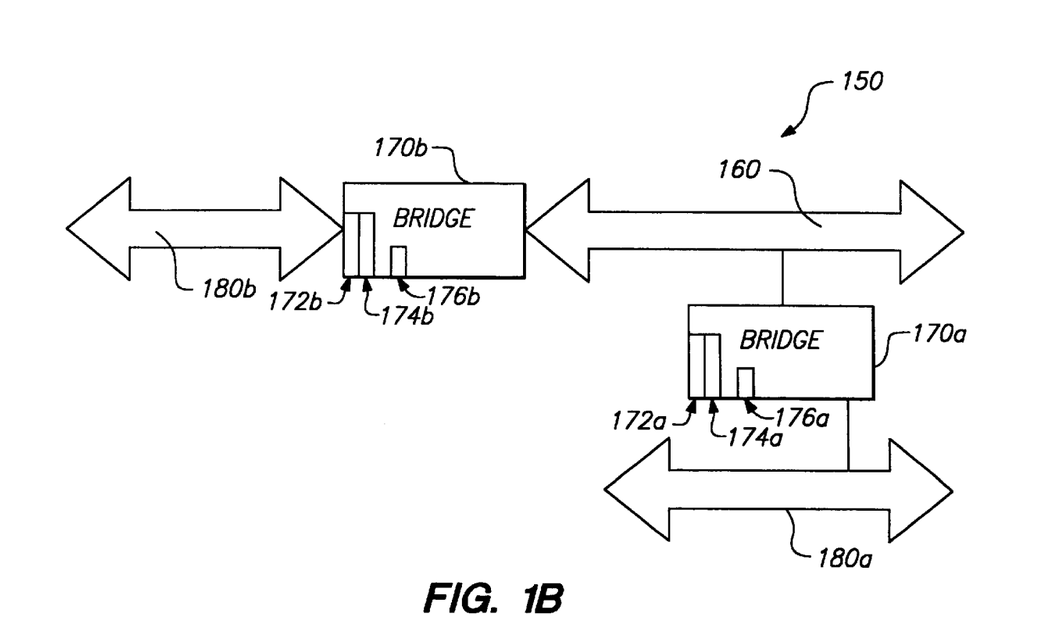

Referring first to FIGS. 1A and 1B, there are shown systems 100, 150 in which the present invention may be usefully implemented. FIG. 1A is a block diagram of a high speed interconnect 110, such as a Serial Express or SCI, that is coupled to first and second buses 130a, 130b through first and second bridges 120a, 120b, respectively. Bridges 120a, 120b include buffers 122a, 122b, respectively, for temporarily storing data, and associated status bits 124a, 124b and counters 126a, 126b, respectively, for tracking data. Also shown are a pair of nodes 142, 144 that communicate through buses 130a, 130b, bridges 120a, 120b, and high speed interconnect 110. In the disclosed embodiment, interconnect 110 supports 64-byte burst transfers, while first and second buses 130a, 130b support 4k byte block transfers and have correspondingly larger arbitration latencies than interconnect 110. Buses 130a, 130b may be, for example, a pair of Serial Buses. Where high speed interconnect 110 is a Serial Express interconnect, bridges 120a, 120b are a pair of Serial Bus to Serial Express bridges.

In order to use buses 130a, 130b and interconnect 110 efficiently, data is transmitted on buses 130a, 130b in block size transfers of up to 4k bytes and data is transmitted on interconnect 110 in 64-byte burst transfers. Consequently, the most efficient way to transmit a 4k byte data block from node 142 to node 144 is to block transfer the 4k byte data block through bus 130a to bridge 120a, burst transfer the 4k byte data block through interconnect 110 to bridge 120b as sixty four 64-byte data blocks, reassemble the 64-byte blocks into a 4k byte data block at bridge 120b, and block transfer the reassembled 4k byte data block to node 144. Reassembly avoids the overhead of independently transferring sixty four (64-byte) blocks of data on bus 130b.

Implementation of data block reassembly requires that bridge 120b recognize how large a data block is to be transferred through the interconnect, commit its resources to the transfer, and determine when all fragments of the data block have been successfully burst transferred through interconnect 110. Similarly, bridge 120a must provide bridge 120b with information on the size of the data block and the status of the transfer. The method of the present invention provides bridges 120a, 120b with the block transfer protocols necessary to handle efficient data transfers through interconnect 110.

FIG. 1B is a block diagram of a system 150 comprising a PCI bus 180a and a HostBus 180b coupled to a high speed interconnect 160 through bridges 170a, 170b, respectively. As above, bridges 170a, 170b include buffers 172a, 172b, respectively, for temporarily storing data, and associated status bits 174a, 174b and counters 176a, 176b, respectively, for tracking data. In system 150, write transactions destined for memory (not shown) through HostBus 180b, are first posted to a large buffer in bridge 170a. The buffer, which could be up to 4k bytes, is required because of the relatively high arbitration latency of transactions passing through bridge 170a, interconnect 160 and bridge 170b. In order to maintain data coherency, these posted writes must be delivered to HostBus 180b in the order received. This is accomplished by bridges 170a and 170b, which implement the method of the present invention to transmit the block of posted writes from bridge 170a through interconnect 160 in 64-byte burst transfers and reform the 64-byte blocks into a data block in bridge 170b.

In addition to the bus configurations of FIGS. 1A and 1B, the present invention may also be usefully implemented in transfers between devices other than buses. For example, in block data transfers from a hard disk to memory over a high speed interconnect, address translation in memory is more efficient where the data is processed as a block rather than as multiple fragments.

One advantage of the method of the present invention is that it allows most of the data to be transferred by move transactions rather than by read or write transactions. Write transactions are less efficient than move transactions because each write requires a confirmation of when the data is transferred, as well as when the write completes. Move transactions, on the other hand, are unconfirmed transactions in that the interconnect does not provide an indication of when the move has completed. The availability of resources for a series of move transfers and the commitment of resources to the move transfers are negotiated through the high level protocols of the present invention. Once commitment of the transferring nodes has been established, the move transfers proceed at the rate allowed by the interconnect.

In the following discussion, the terms "data block", "block transfer", and "block size" will be used to refer to data packets that are transferred between bridges 120a, 120b and buses 130a, 130b, respectively, and between bridges 170a, 170b and buses 180a, 180b, respectively. The terms "burst", "burst transfer", and "burst size" will be reserved for data packets transferred between bridges 120a, 120b via interconnect 110 and between bridges 170a, 170b via interconnect 160. Similarly, block transfer related read or write transactions occurring on interconnect 110 or 160 are referred to as readPlus and writePlus transactions, respectively, to distinguish them from the read and write transactions occurring on buses 130a, 130b, 180a, 180b. The initiator is the bridging device that launches a readPlus or writePlus request on receipt of a read or write block transfer request, respectively, and the target is the bridging device that processes the readPlus or writePlus request. In the example provided above, bridge 120a is the initiator and bridge 120b is the target.

Figure 2:
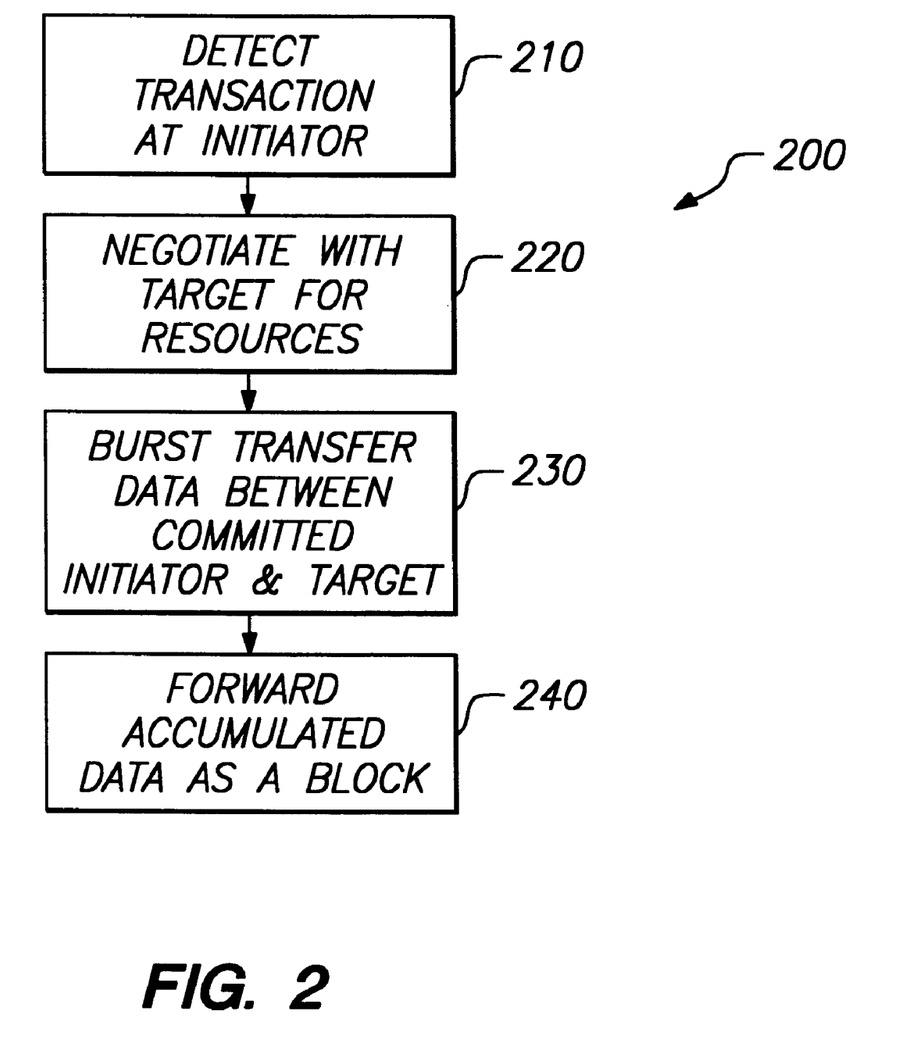
FIG. 2 is a flow chart of a method for implementing data transfers in accordance with the present invention.

Referring now to FIG. 2, there is shown an overview of a method 200 in accordance with the present invention for transferring relatively large data blocks across a high speed interconnect that supports smaller burst transfers. Method 200 is triggered when the initiator detects 210 a transaction. Typically, this will be a read or write request originating on a node associated with the initiator and specifying a responding node associated with a target that is coupled to the initiator through the high speed interconnect. On receipt of the transaction, the initiator negotiates 220 with the target for the resources necessary to complete the block transfer. Once the necessary target resources have been committed, the data block is transferred 230 through the interconnect as a series of smaller burst transfers. For write transactions, the burst transferred data is accumulated in the target until all transfers have been completed, at which time the data is forwarded 240 by the target to its associated responder node, and a status burst is returned from the target to the initiator. For read transactions, the burst transferred data is accumulated in the initiator until all transfers have been completed, at which time the data is forwarded 240 by the initiator to its associated requesting node.

Figure 3A:
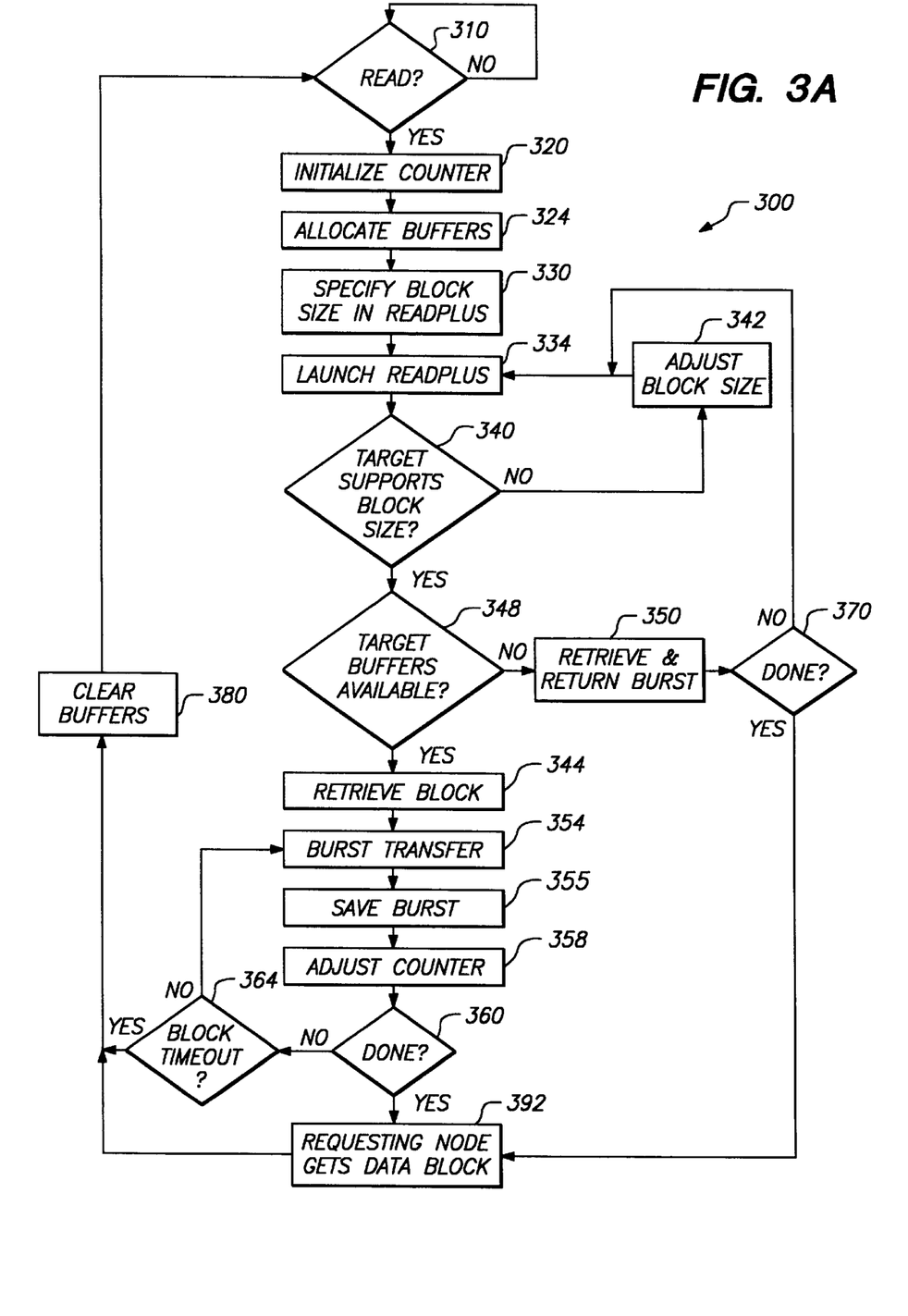
FIGS. 3A, 3B are detailed flow charts of methods for implementing burst read transactions in accordance with the present invention.

Referring now to FIG. 3A, there is shown a detailed flowchart of method 300 in accordance with the present invention for implementing block read transactions. When the initiator detects 310 a read transaction, it clears 320 its counter, allocates buffers 324 to receive the requested data, specifies a block size 330 in a readPlus request, and launches 334 the request to the target. The block size is the size of the data block requested in the read request. It determines the target resources necessary to treat the requested data as an integral block.

The preferred embodiment of the present invention accommodates different conditions regarding buffer availability at the target. A target that supports the specified block size either may or may not currently have sufficient buffers to accommodate the transaction. Alternatively, a target may only support a smaller data block size. Method 300 handles all of these conditions.

If the target supports the specified block size 340, it retrieves one burst 350 or all of the requested data 344, depending on whether buffers are currently available to store the full block size. However, it is noted that in some applications, there may be logic-based reasons for maintaining the integrity of the data block. In these cases, the transaction is refused and block 350 is nullified or not performed until the necessary buffers are available to accommodate the full block size.

When the target currently has buffers available and retrieves the full data block 344, it responds to the initial readPlus with a series of move (burst transfer) transactions 354. As each move transaction received, the initiator saves 355 the data burst, adjusts its counter 358, and determines 360 whether all move transactions have been received. For reliable data links, the last step may be accomplished by comparing in 360 the counter with the number of burst transfers necessary to transfer the specified data block size.

If more move transfers are expected 360 and a block time-out interval has not expired 364, the next move transaction is sent 354 from the target to the allocated memory in the initiator. This continues until the target determines 360 that all data has been transferred to the initiator or a time-out has occurred. In the first case, the initiator forwards 392 the accumulated data bursts to the requesting node as a data block, after which the initiator and the target clear 380 their buffers. When a time out is detected 364, the initiator and target clear 380 their respective buffers and await a new read 310. In the preferred embodiment of the invention, the initial readPlus transaction includes a copy of the block time-out interval value, which allows the data block to be identified as stale at any time during the burst transfer process. At the beginning of the block time-out interval, all burst transfer stop. At the end of the block time-out, committed resources are released. Once the buffers are cleared in step 380, the transfer is complete and the method returns to step 310 to detect further transfers.

If the target supports the specified data block size but currently has insufficient buffers available to accommodate 348 a full block of data, the target responds 350 by accessing the responding node and completing the initial readPlus with a burst transfer and waits for another readPlus transaction. This is stored 350 by the initiator and the target waits for another readPlus transaction. Subsequent readPlus transactions will trigger single burst transfer responses 350 until the full block of data originally requested has been transferred to the initiator 370 or until the target's available buffers are sufficient to accommodate the remainder of the data block. In effect, method 300 defaults to fragmented transmission of data bursts when the target buffer capacity is unavailable for the block transfer. On the other hand, if the target buffers do become available during the transaction, method 300 proceeds as described above.

When the specified data block size is larger 340 than that supported by the target, the target response triggers the initiator to adjust 342 the specified data block size. The initiator then launches 334 a readPlus transaction including the adjusted data block size. Thereafter, method 300 proceeds as described above, with the actual steps determined by whether the target currently has sufficient memory to accommodate the full data block.

As noted above, there may be applications in which logic-based constraints make it preferable to maintain the integrity of the data block, rather than defaulting to fragmented transmission when buffers are unavailable for a supported data block size. In these applications, the target will not respond with a burst transfer, and the initiator will retry the readPlus transaction until the buffers become available.

Figure 4A:
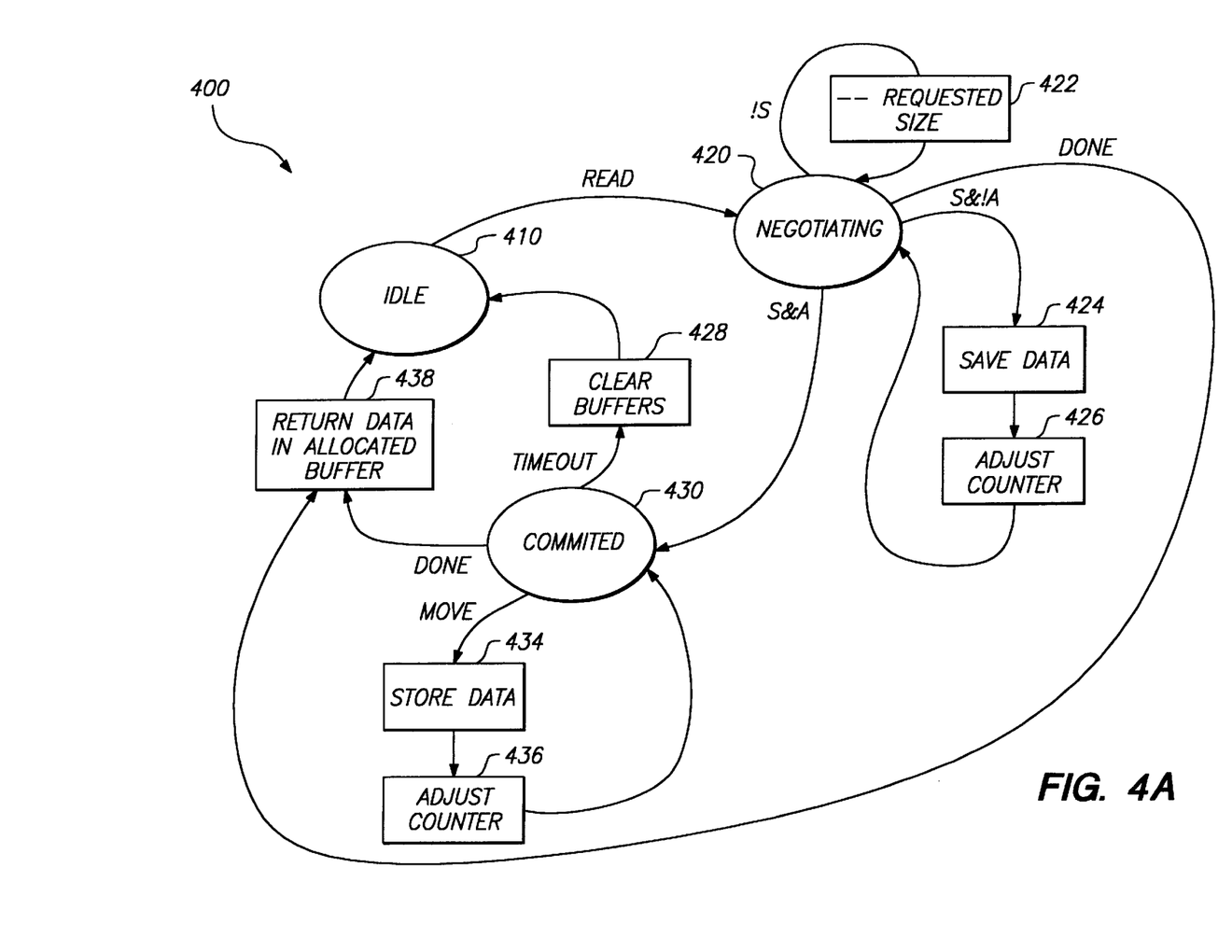
FIGS. 4A and 4B are state machines for the initiator and target bridges, respectively, for read transactions in accordance with the present invention.

Referring now to FIG. 4A, there is shown a diagram of a state machine 400 for implementing the initiator's steps in method 300. Initiator state machine 400 may be implemented, for example, in bridge circuits 120a, 120b of FIG. 1A or bridge circuits 170a, 170b of FIG. 1B. Initiator state machine 400 begins in an idle state 410 and makes a transition to a negotiating state 420 on receipt of a READ request. In negotiating state 420, state machine 400 sends to a target a readPlus request that specifies, among other things, the size of the data block to be retrieved. Depending on the response signal provided by the target, initiator state machine 400 may transition to a committed state 430 or remain in negotiating state 420. Initiator state machine 400 enters committed state when the target response indicates that it has committed to the transaction the resource necessary to treat the burst transferred data as a data block of the specified size. Initiator state machine remains in negotiating state 420 as long as the target remains uncommitted to the block transaction, either because it does not support the specified block data size or it currently lacks the buffer capacity to handle the specified block data size.

State machine 400 makes a transition from negotiating state 420 to committed state 430 when the target response indicates that it supports (S) block data of the specified size and currently has buffer capacity available (A) for the requested block data, labeled as (S & A). If the target response indicates that it only supports a smaller block size (!S), state machine 400 adjusts 422 the specified size of the data block accordingly and forwards a readPlus transaction with the adjusted size to the target. Provided the target has the buffers available to handle the transactions with the adjusted block size, its response triggers state machine 400 to make the (S & A) transition to committed state 430.

When the target supports data blocks of the size specified in the readPlus request but currently lacks the buffer capacity to handle the request (S & !A), it responds with a burst transfer. In this case, state machine 400 transitions to saving the returned data in state 424, then transitions to state 426 to adjust its counter to reflect the returned data, and returns to state 420 where another readPlus request is sent. This loop is repeated until either the target responds with S & A or the counter indicates that all burst transfers have been made (DONE). In the latter case, the data in the allocated buffer is returned 438 to the requester and the state machine 400 enters the idle state. When state machine 400 enters committed state 430, it receives the requested data block as a series of MOVE transactions (burst transfers), transitions to state 434 to store the transferred burst and transitions to state 436 to adjusts its counter as each burst transfer is stored. If a TIME-OUT is detected before all burst transfers are received, state machine 400 clears 428 its buffers and returns to initial state 410, where it is ready to send out new block requests. If all burst transfers are completed before a block time-out interval begins (DONE), state machine 400 transitions to state 438 where the accumulated burst is transferred to the requesting node as a data block.

Figure 4B:
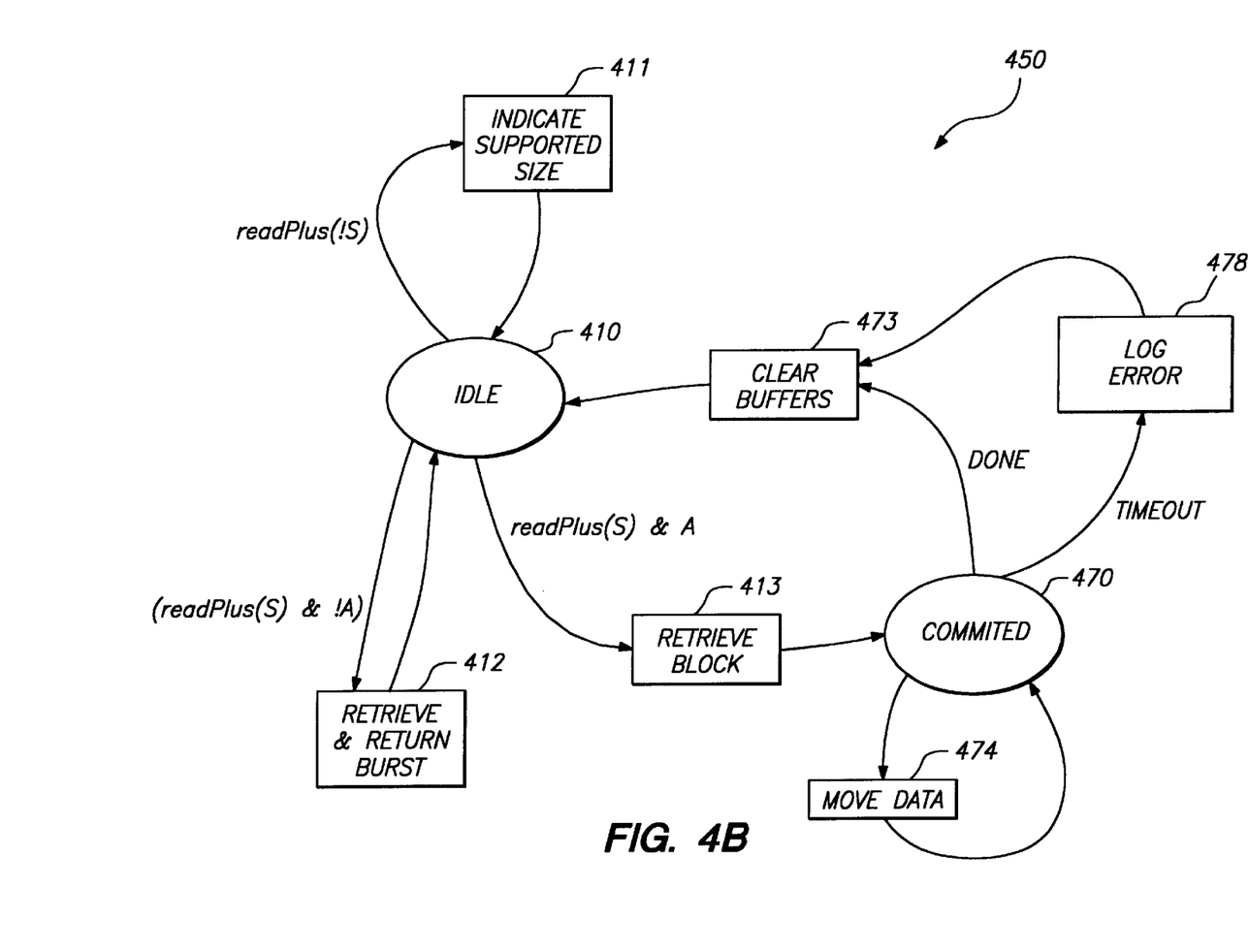

Referring now to FIG. 4B, there is shown a state machine 450 for implementing the target's steps of method 300. In this figure, the readPlus request is parameterized according to the data block size specified (S), and the availability of buffers in the target for the specified data block size is indicated by (A). Thus, target state machine 450 transitions from idle state 410 through state 411 when the readPlus request specifies a data block size that is not supported by the target (!S). If the target supports the specified data block size but currently lacks available buffers (!A) to handle the data block, state machine 450 transitions from the idle state 410 through state 412, retrieving and returning a smaller burst. In either case, state machine 450 remains in the idle state 410.

If target state machine 450 does not support the specified data block size, it sends a response to the initiator indicating the size data block it does support. On the other hand, if the target supports the specified size but the currently available buffer capacity is insufficient to handle the requested data block (!A), target state machine 450 indicates its lack of capacity to the initiator and burst transfers a portion of the data to the initiator. In either case, target state machine 450 returns to idle state 410 until buffers become available to accommodate the data block size (A) or until the entire data block has been burst transferred to the initiator. Target state machine 450 transitions through state 413 to committed state 470 from idle state 410 on receipt of a readPlus request specifying a data block size that is supported and for buffers are currently available (readPlus(S) & A). In state 413, the target retrieves the requested block, saving it into its buffer. In committed state 470, target state machine 450 transitions through state 474 to transfer the retrieved data block as a series of burst transfers until all data is transferred to the initiator (DONE) or a TIME-OUT signal is received. If a TIME-OUT is received before all data is transferred, target state machine 450 first transitions to state 478 and clears and logs an error in an error record, then transitions through state 473 to clear its buffers, and finally returns to idle state 410 to await a new block transfer request. If a DONE signal is received, the target state machine 450 transitions directly to state 473 to clear its buffers and then returns to idle state 410.

Method 300 is suitable for those situations where the links between communicating nodes are dependable and there is a high probability that transactions between requesting and responding nodes will be exchanged successfully. Where the communications links are less reliable, the protocol may incorporate additional phases that allow the system to determine when transactions through the interconnect have not been received and to complete transmission of these transactions. The expanded protocol provides for more robust data exchange over less reliable links.

Figure 3B:
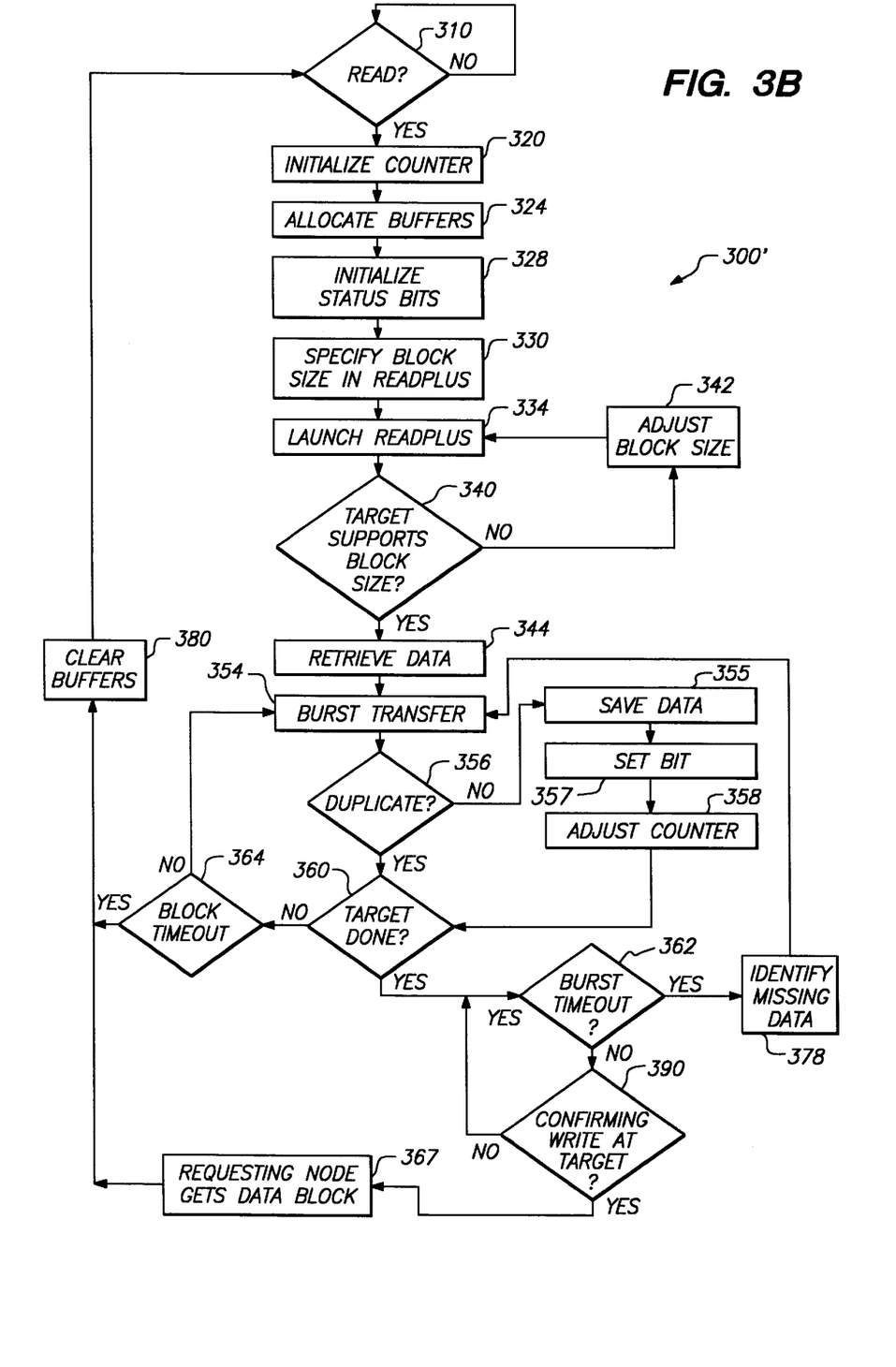

Referring now to FIG. 3B, there is shown a method 300' that has been modified to provide more robust readPlus transactions between the initiator and target. The same numbering is used for steps that are unchanged between methods 300 and 300'.

As before, when the initiator receives 310 a read request, a transaction counter is initialized 320 and buffers are allocated in step 324 to receive the requested data. In addition, a set of status bits associated with the allocated buffers are initialized in step 324. These bits are initialized to zero and each bit is set to one when a burst transfer sent by the target is successfully received and transferred to the allocated buffer associated with the bit.

Following initialization steps 320, 324, 328, method 300' proceeds in parallel to method 300 until the target responds 354 with burst transfers of requested data. Since robust method 300' allows burst transfers to be repeated, the initiator must determine whether a received burst transfer has already been stored. Thus, for each burst transfer received, the initiator determines 356 whether the corresponding status bit is set. If the status bit is zero, the allocated buffer has not yet received the data burst assigned to it. Accordingly, the data is saved 355, the corresponding status bit is set 357, and the counter is adjusted 358. If the status bit is already set 356, the burst transfer is discarded.

Each burst transfer is checked 360 to determine if it is the last. When more burst transfers remain, a block time out is checked 364 to determine whether the interval for responding to the initial read transaction has expired. If it has, buffers in the target and initiator are cleared 380 and the initiator waits 210 for a new read request. It the block time out has not expired 364, a burst time-out is checked 362 to determine whether the response time on the local interconnect has expired. If the initiator sends the target a confirming write transaction 390 before the burst time-out interval elapses 362, the requesting node gets the data block 367, and the block transfer completes. If the burst time-out interval has elapsed 362, missing data, as determined by reference to the status bits, is identified 378 to the target, which resends the missing data without clearing the buffers. In this case, burst transfers already received by the initiator are not discarded, and only those not yet received are retransmitted and stored in step 355.

The status bits are checked in 360 by the initiator to determine whether all data has been received. If all data has been received and stored in the allocated buffers, the initiator sends 390 a confirming write 390 to the target, which releases it resources from the transaction. If all data has not been received, the target reads 378 the initiator's status bits which identifies missing bursts, and the target resends the missing data.

Figure 5A:
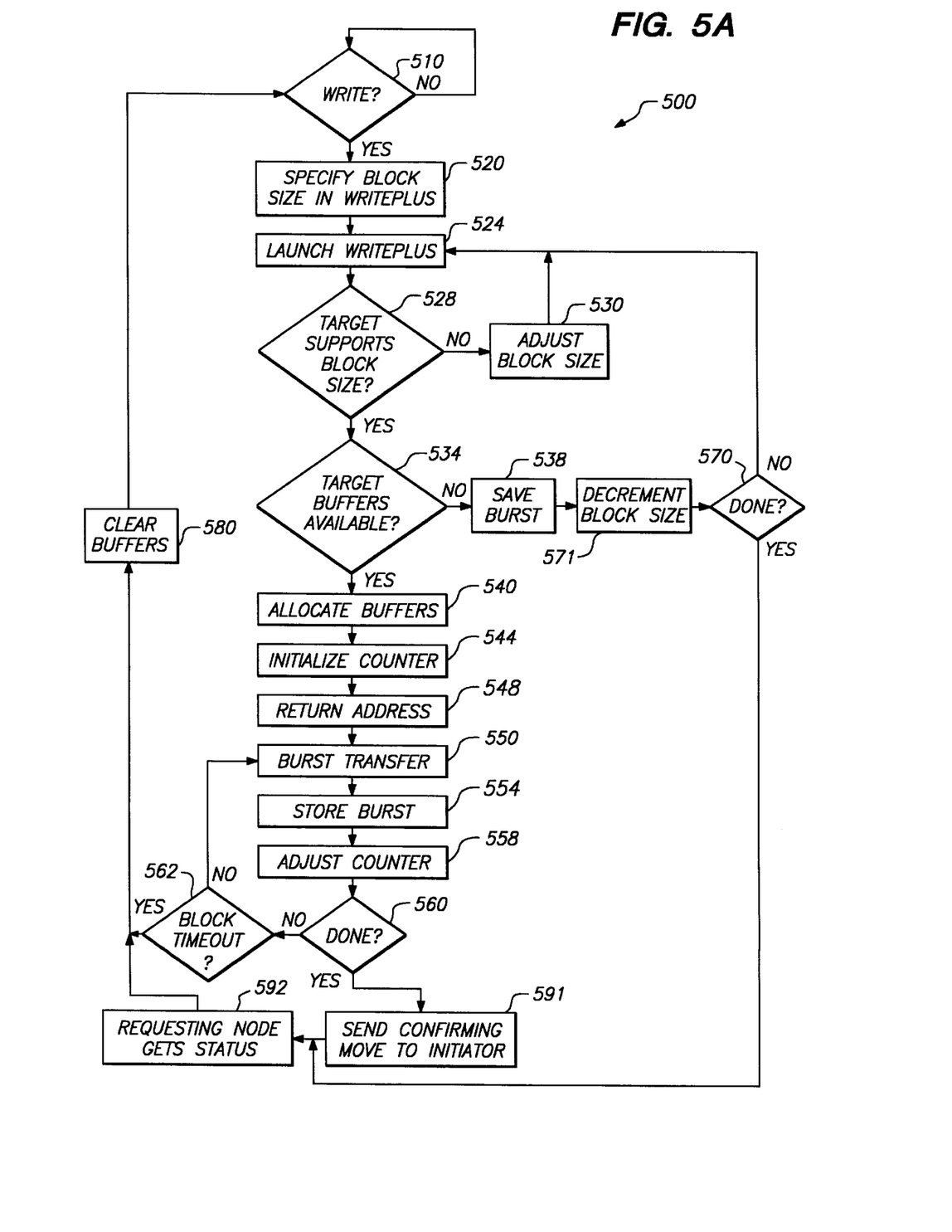
FIGS. 5A and 5B are detailed flow charts of methods for implementing burst write transactions in accordance with the present invention.

Referring now to FIG. 5A, there is shown a flowchart 500 of a method for implementing write transactions in accordance with the present invention. When the initiator detects 510 a write request, it specifies 520 a block size for the data to be written and launches 524 a writePlus transaction to the target. The target response indicates whether it supports 528 the specified block size and if it does, whether it has buffers currently available 534 to receive the data block. If the target does not support 528 the specified block size, its response triggers the initiator to adjust 530 the data block size and relaunch 524 the writePlus. If the target supports 528 the specified data block size but currently lacks buffer capacity 534 to receive the data block, it saves 538 the data portion provided with the writePlus request, and the initiator's block size is decremented 571. If more of the data block remains to be transferred 570, another writePlus is launched by returning to step 524. In an alternative embodiment, the target may refuse any burst transfers nullifying and not performing steps 538 and 571 until the necessary buffers are available. If no more of the data block remains to be transferred in step 570, the method continues in step 592 where the requesting node gets the status information.

Where the target supports 528 the specified block size and currently has buffers available to receive the data block 534, it allocates buffers 540 for the transaction, initializes a counter 544 to track the transferred data, and returns the address of the locations of the allocated buffers to the initiator. At this point, both the initiator and target are committed to the block transaction, which then proceeds as a series of burst transfers.

The burst transfer process comprises moving a portion of the data block as a smaller data burst transfer 550 from the initiator to the target, storing 554 the transferred data in one of the allocated buffers, adjusting 558 the counter, and determining 560 whether the burst transfer included the last of the data block. If more data remains, and a block time-out interval has not yet elapsed 562, the next burst of data is transferred 550. If the time-out interval has elapsed 562, the target clears its buffers 580 and awaits for a new block transfer transaction. If there no more data remains, the method sends 591 a signal confirming the move to the initiator, and then the requesting node 592 get the status.

Figure 6A:
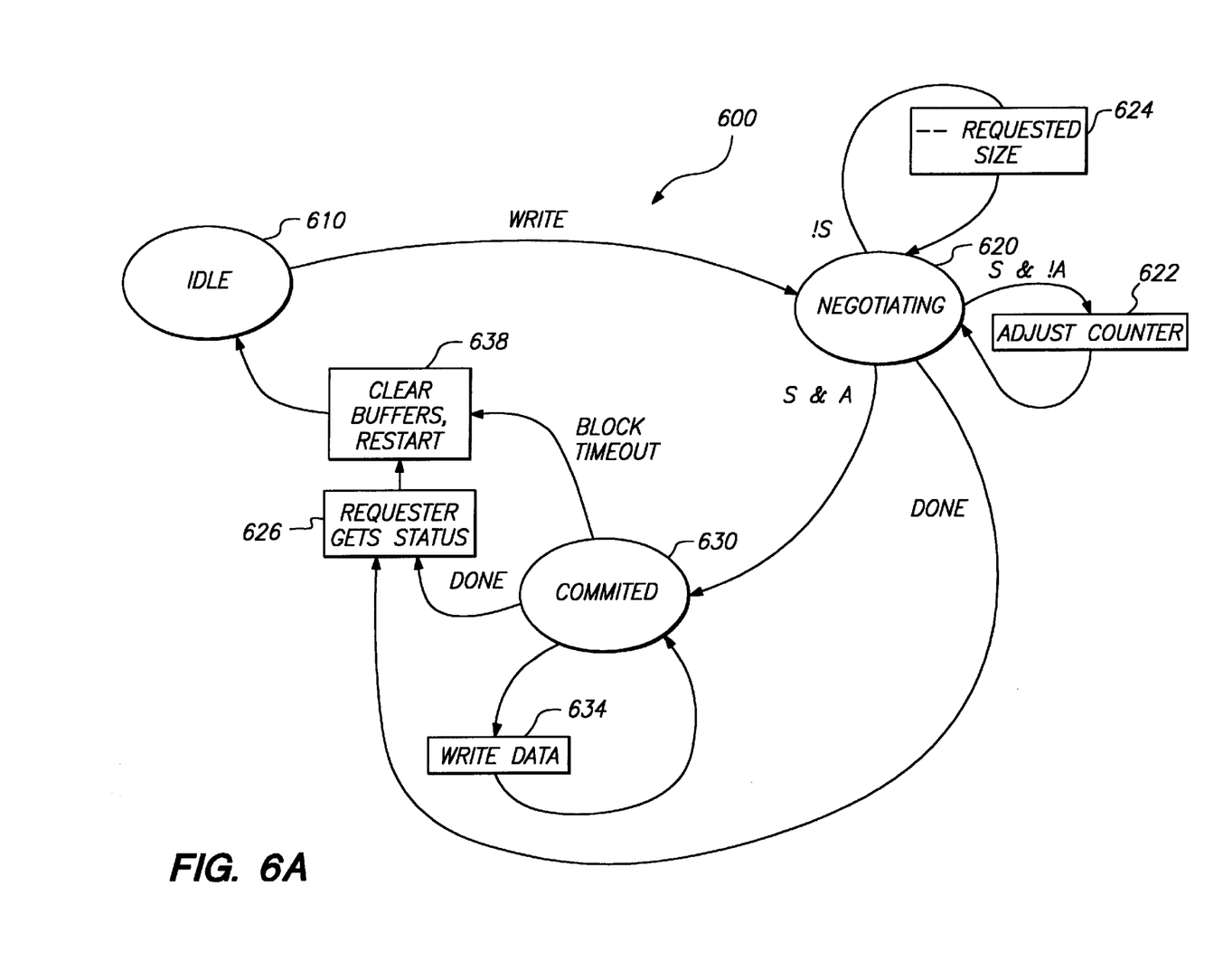
FIGS. 6A and 6B are state machines for the initiator and target bridges, respectively, for write transactions in accordance with the present invention.

Referring now to FIG. 6A, there is shown a state machine 600 for implementing the steps of method 500 carried out by the initiator. Initiator state machine 600 makes a transition from an idle state 610 to a negotiating state 620 when it receives a WRITE request. In negotiating state 620, initiator state machine 600 sends to the target, a writePlus request specifying the size of the data block to be written. If the target response indicates that the target both supports the specified block size and currently has buffers available to receive the data block (S & A), initiator state machine 600 makes a transition to committed state 630. If the specified burst size is not supported (!S), initiator state machine 600, transitions through state 624 to adjust the size of the data block specified, returning to state 620 where it launches the adjusted writePlus to the target.

Provided the target currently has buffers available to receive the adjusted data block size, initiator state machine 600 makes the transition to committed state 630 and burst transfers data 634 to the target. The burst transfers 634 continue until the entire block has been written to the target (DONE) or a block time-out interval expires. In the former case, the requester gets status 626 and clears 638 its buffers before the initiator state machine 600 returns to the idle state 610. In the latter case, initiator state machine 600 clears 638 its buffers and awaits for a new WRITE in the idle state 610.

On the other hand, if the target currently lacks the buffer capacity to accommodate the full data block (S & !A), initiator state machine 600 adjusts a counter 622 and prepares another writePlus. Each writePlus transfers a burst of data to the target. This stepwise burst transfer process continues until either the buffer capacity becomes available in the target (S & A), or the entire data block is transferred by the repeated writePlus transactions (DONE). As noted in connection with method 300, in some applications it may be necessary for the target to refuse the transaction until it has the necessary buffers to accommodate the full block size. Similar to transitioning from the committed state 630 to the idle state 610 upon DONE signal, the state machine 600 transitions from the negotiating state 630 to the idle state with the requester getting status 626 and clearing 638 its buffers.

Figure 6B:
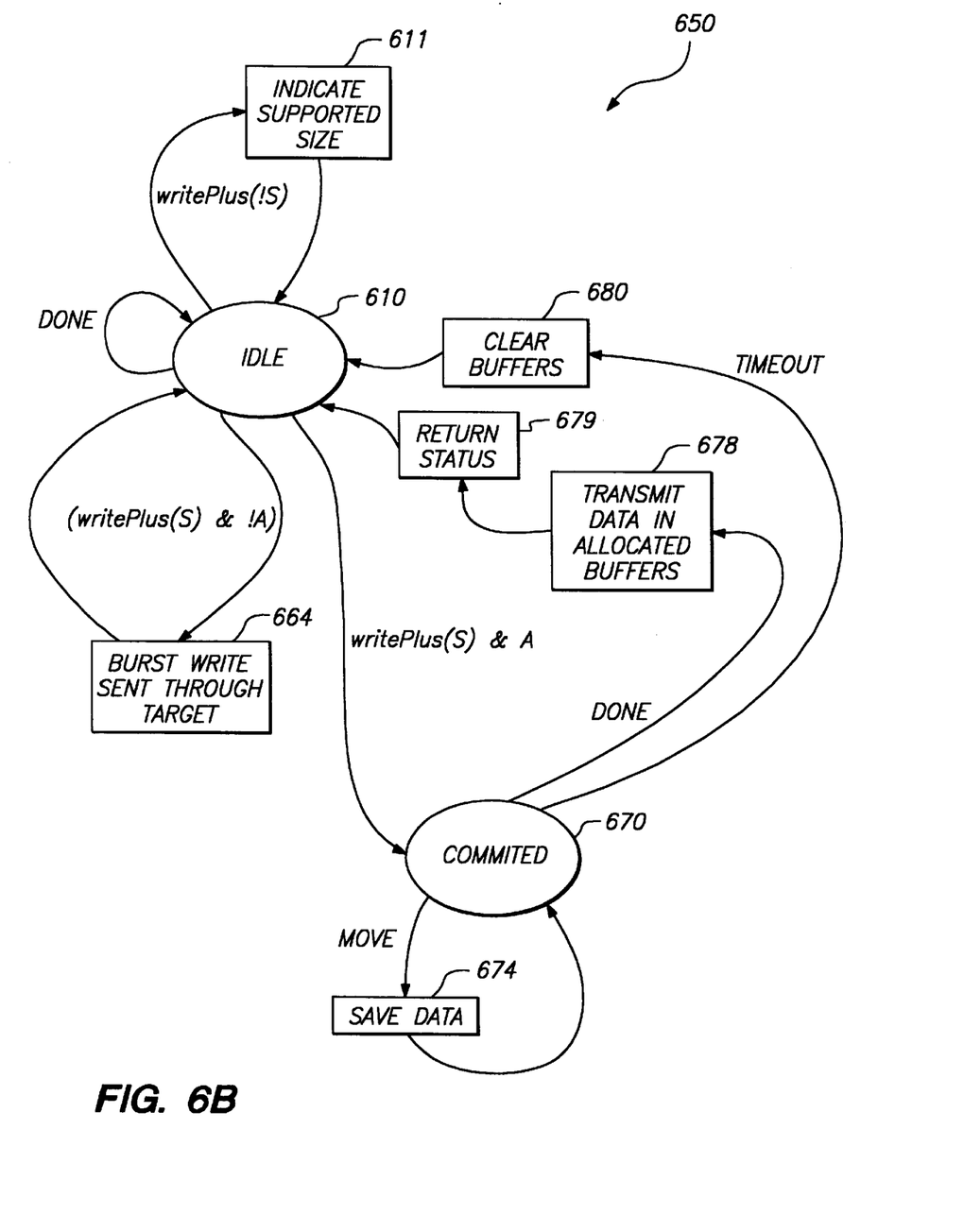

Referring now to FIG. 6B, there is shown a state machine 650 for implementing the steps of method 500 that are performed by the target of the WRITE transaction. When the writePlus request specifies a block data size supported by the target and the target currently has buffers available to accommodate the data (writePlus(S) & A), target state machine 650 makes a transition to committed state 670, where it repeatedly transitions through state 674 to store data transferred by repeated burst transfers from initiator state machine 600. The burst transfers proceed until target state machine 650 either determines that the entire data block has been received (DONE) or a block time-out occurs. In the first case, target state machine 650 transitions through state 678 to transmit the received data as a data block to the destination specified in the original WRITE transaction, transitions through state 679 to return status, and returns to idle state 610. In the second case, target state machine 650 clears its buffers in state 680 and returns to idle state 610.

When the writePlus specifies a data block size that is not supported by target state machine 650 (writePlus(!S)), target state machine 650 makes a transition from idle state 610 through state 611. In state 611, target state machine 650 responds to a writePlus specifying an unsupported data block size with an indication of the size data block it supports. The subsequent writePlus is adjusted by the initiator to reflect this supported data block size, and, provided the target currently has buffers available to accommodate the data (S & A), target state machine 650 transitions from idle state 610 to committed state 670.

When the target currently lacks the buffer capacity to accommodate a supported data block size (writePlus(S) & !A), it transitions through state 664 forwarding the write to its affiliated responder and indicates the lack of available buffer capacity to the initiator, after which the target state machine 650 returns to state 610 until either the buffer capacity necessary to accommodate the data block becomes available (S & A) or all data from the block is transferred by separate writePlus transactions (DONE). In the first case, target state machine 650 transitions to committed state 670 to receive the remainder of the data block through a series of burst transfers. In the second case, target state machine 650 transitions back to idle state 610.

As in the case of read transactions, write transactions may be made more robust by incorporating some additional signals into the protocol. These additional signals support error detection and recovery, making data transmission on less reliable links more dependable.

Figure 5B:
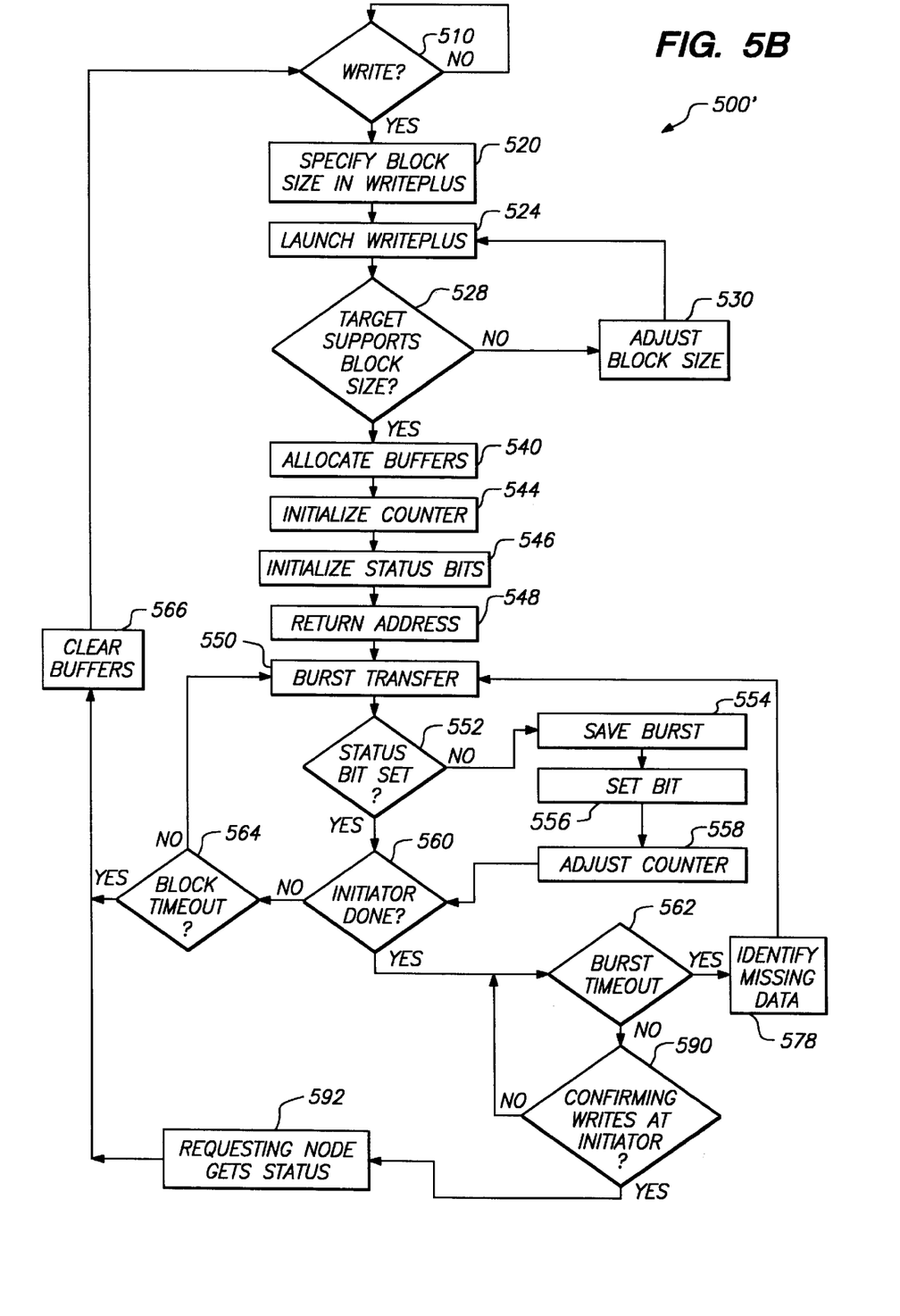

Referring now to FIG. 5B, there is shown a flowchart of a method 500' for providing robust data transmission over less-reliable communication links. The same numbering is used for steps that are unchanged between methods 500 and 500'.

As before, when the initiator detects 510 a WRITE request, the data block size is specified 520 in a writePlus, which is launched 524 to the target identified in the WRITE. Following launch 524 of the writePlus, method 500' proceeds in parallel with method 500 until step 546, where method 500' initializes a set of status bits associated with each buffer location allocated in step 540 to receive the data block. These status bits track whether a data burst assigned to one of the allocated buffers was received, and consequently which data bursts are necessary to complete transmission of the data block.

Following the target initialization steps 540, 544, 546, 548, the data block is burst transferred 550 to the target. For each burst transfer received, the target determines 552 whether the corresponding status bit is set. If the status bit is zero, the allocated buffer has not yet received the data burst assigned to it. Accordingly, the data is saved 554 to the buffer, the status bit is set 556 is set, and the counter is adjusted 558. If the status bit is already set 552, the burst transfer is discarded.

Each burst transfer is checked in step 560 to determine if it is the last. This may be done by monitoring the counter. When more burst transfers remain, a block transaction time out is checked in step 564 to determine whether the interval for responding to the original write request has elapsed. If the block transfer time-out has elapsed, target and initiator buffers are cleared in step 566 before returning to step 510 where the initiator awaits a new block-transfer request. If this interval has not elapsed in step 564, the next burst transfer is sent in step 550. If the burst transfer time-out interval has elapsed 562, the initiator sends a read to the target to identify missing data by reference to the status bits. The initiator then resends the missing data via steps 552, 554, 556, and 558.

When the last burst transfer of the data block is detected 560, the target sends 590 a confirming write to the initiator, the requesting node gets status 592, and resources from the transaction are released 566. Receipt of all data at the target may be determined by comparing the counter, which sums all status bits, with the number of burst transfers expected for the block.

There has thus been disclosed a system and method for transferring blocks of data across a high speed interconnect that supports burst transfers that are smaller than the size of the data block to be transferred. Signals exchanged between an initiator and target bridge allow the devices to commit to the block transaction until all data in the block has been transmitted through the interconnect as a series of burst transfers. Counters and status bits track the status of each data burst transfer, which is accumulated until all burst transfers are completed. The accumulated data is then forwarded to the appropriate node as an integral block of data.

We claim:

1. A method for transferring data between an initiator device and a target device, the initiator and target devices being coupled by an interconnect and the target device having a predetermined amount of temporary storage capacity, the method comprising the steps of:

receiving a block transaction request at the initiator device;

generating a first data transfer signal including an optimum block size value indicating an amount of data to be transferred, and sending the data transfer signal to the target device;

processing the first data transfer signal at the target device to determine whether the optimum block size can be transferred;

comparing the amount of data to be transferred to the predetermined temporary storage capacity;

generating a second data transfer signal including an indication of the predetermined temporary storage capacity available for the requested transaction, and sending the second data transfer signal to the initiator device; and responsive to an indication that the predetermined temporary storage capacity is sufficient for the data to be transferred, implementing the requested transaction between the initiator and target devices as a plurality of move transactions.

2. The method of claim 1, wherein the receiving step comprises receiving a read request at the initiator device including an indication of the amount of data to be read.

3. The method of claim 2, comprising the additional step of, following receipt of the read request, allocating storage in the initiator device sufficient to accommodate the data to be read.

4. The method of claim 3, wherein the step of generating a first data transfer signal comprises generating a first data transfer signal including a value indicating an amount of data to be transferred and a location of the allocated storage in the initiator device.

5. The method of claim 4, wherein the comparing step comprises the substeps of:

comparing the amount of data to be transferred to the predetermined temporary storage capacity; and when the predetermined temporary storage capacity is sufficient to accommodate the data to be transferred, retrieving the data to be transferred to the target device.

6. The method of claim 5, comprising the additional step of, responsive to an indication that predetermined temporary storage capacity is insufficient for the data to be transferred, returning to the step of generating a first data transfer signal wherein the indicated value of the amount of data to be transferred is adjusted according to the predetermined temporary storage capacity at the target node.

7. The method of claim 1, wherein the receiving step comprises receiving a write request at the initiator device including an indication of the amount of data to be written.

8. The method of claim 7, wherein the comparing step comprises the substeps of:

comparing the amount of data to be transferred to the predetermined temporary storage capacity; and when the predetermined temporary storage capacity is sufficient to accommodate the data to be transferred, allocating storage in the target device to accommodate the data to be transferred.

9. The method of claim 8, wherein the step of generating the second data transfer signal comprises generating a second data transfer signal including a location for the allocated storage in the target device and sending the second data transfer signal to the initiator device.

10. The method of claim 7, comprising the additional step of, responsive to an indication that predetermined temporary storage capacity is insufficient for the data to be transferred, returning to the step of generating a first data transfer signal wherein the indicated value of the amount of data to be transferred is adjusted according to the predetermined temporary storage capacity at the target node.

11. A device for transferring data blocks of a first size through an associated high speed interconnect that supports burst transfers of a second size that is less than the first size, the device comprising:

a first port for transferring data and transaction information into and out of the device;

a second port coupled to the interconnect, for transferring data and transaction information between the device and the associated interconnect;

a storage location for temporarily storing data transferred to the device through the first and second ports; and a state machine coupled to the first and second ports, the state machine comprising logic for detecting a transaction request at the first port, generating a first data transfer signal including an optimum data block size for the first port and specified in the transaction request at the second port, generating a second data transfer signal including an indication of buffer availability signal at the second port, and transferring data specified in the transaction request as a plurality of move transactions responsive to receipt of a buffer availability signal at the second port.

12. The device of claim 11, wherein the state machine further comprises logic for determining a number of burst transfers of the second size necessary to transfer a specified data block of the first size.

13. The device of claim 12, wherein the state machine further comprises:

a plurality of buffers within the storage location;

a plurality of status bits, each status bit being associated with one of the plurality of buffers; and bit-setting logic coupled to the pluralities of status bits and buffers, for setting each status bit as data is transferred to the buffer associated with the status bit.

14. The device of claim 13, wherein the state machine further comprises logic for counting the number of status bits that have been set with the determined number of burst transfers to determine a status of the requested transaction.

15. A method for transferring data between an initiator device and a target device characterized by a optimum target data block size and a target buffer capacity, through an interconnect characterized by burst transfer size, the method comprising the steps of:

detecting at the initiator device a transaction request including a specified data block size;

transmitting from the initiator device to the target device an indication of the requested transaction, including the specified data block size;

processing the indication at the target device to determine availability of the target device for the requested transaction;

transmitting from the target device to the initiator device a response including an indication of availability of the target device; and transferring data of the specified data block between the initiator and target devices as a plurality of move transactions when the initiator device detects an indication that the target device is available.

16. The method of claim 15, wherein the step of processing the indication comprises the substeps of:

comparing the specified data block size with the target data block size to determine whether the target supports the specified data block; and comparing the specified data block size with the target buffer capacity currently available to determine whether the target can currently accommodate the specified data block size.

17. The method of claim 16, wherein the step of transmitting a response comprises the substeps of:

generating a target available indication when the specified data block size is supported by the target and the target can currently accommodate data of the specified block size;

generating a target unavailable indication including the target data block size when the specified data block size is not supported by the target; and generating a target conflict indication when the specified data block size is supported but cannot be accommodated currently.

18. The method of claim 17, comprising the additional step of:

adjusting the specified data block size to a smaller value when the initiator device detects a target unavailable indication; and returning to the step of transmitting an indication from the initiator device.

19. The method of claim 17, further comprising returning to the step of transmitting an indication from the initiator device when the initiator device detects a target busy indication.

20. The method of claim 19, wherein the returning step comprises the substeps of:

transferring a burst of data between the initiator and target devices;

adjusting the specified data block to reflect the transferred data burst; and returning to the step of transmitting an indication from the initiator device.

21. The method of claim 15, wherein the transaction request is a read request and the step of transmitting from the initiator device comprises the substeps of:

allocating a plurality of initiator storage locations for receiving data transferred from the target device; and transferring to the target device an indication of the requested transaction, including the specified data block size and the plurality of storage locations.

22. The method of claim 21, comprising the additional steps of:

identifying a status bit associated with each storage location of the plurality of storage locations following the allocating step; and setting each of the associated status bits to indicate no data is present in the associated storage location.

23. The method of claim 22, wherein the step of transferring the specified data block between the initiator and target devices as a plurality of move transactions comprises the substeps of:

for each of the plurality of move transactions, transferring data specified in the move transactions to one of the allocated storage locations; and setting the status bit associated with the storage location to indicate the data has been transferred.

24. The method of claim 23, comprising the additional steps of:

forwarding the transferred data from the initiator when a sum of the set status bits reaches a selected value; and providing the storage locations associated with unset status bits if the sum of set status bits does not reach the selected value within a predefined time limit.

25. The method of claim 15, wherein the transaction request is a write request and the step of transmitting from the target device comprises the substeps of:

allocating a plurality of target storage locations for receiving data transferred from the initiator device; and transferring to the initiator device a response including an indication of availability of the target device and, when the indication is that the target is available, the plurality of storage locations.

26. The method of claim 25, comprising the additional steps of:

identifying a status bit associated with each storage location of the plurality of storage locations following the allocating step; and setting each of the associated status bits to indicate no data is present in the associated storage location.

27. The method of claim 26, wherein the step of transferring the specified data block between the initiator and target devices as a plurality of move transactions comprises the substeps of:

for each of the plurality of move transactions, transferring data specified in the move transactions to one of the allocated storage locations; and setting the status bit associated with the storage location to indicate the data has been transferred.

28. The method of claim 27, comprising the additional steps of:

forwarding the transferred data from the target when a sum of the set status bits reaches a selected value; and providing the storage locations associated with unset status bits if the sum of set status bits does not reach the selected value within a predefined time limit.

* * * * *